United States Patent [19]

Schwarz

[11] Patent Number: 5,406,469
[45] Date of Patent: Apr. 11, 1995

[54] ELECTRONIC SWITCHING POWER SUPPLY

[75] Inventor: Gerhard Schwarz, Altena, Germany

[73] Assignee: Braun Aktiengesellschaft, Frankfurt, Germany

[21] Appl. No.: 269,962

[22] Filed: Jun. 30, 1994

Related U.S. Application Data

[63] Continuation of Ser. No. 927,519, filed as PCT/DE91/00/35, Feb. 20, 1991.

[30] Foreign Application Priority Data

Mar. 17, 1990 [DE]  Germany .................. 40 08 663.1

[51] Int. Cl.$^6$ ............................................ H02M 3/335
[52] U.S. Cl. ........................................ 363/21; 363/19; 363/49
[58] Field of Search ............... 363/18, 19, 20, 21, 363/49

[56] References Cited

U.S. PATENT DOCUMENTS

| | | | |
|---|---|---|---|
| 4,236,198 | 11/1980 | Ohsawa et al. | 363/49 |
| 4,459,651 | 7/1984 | Fenter | 363/21 |
| 4,504,775 | 3/1985 | Becker | 320/32 |
| 4,510,562 | 4/1985 | Maeba | 363/19 |
| 4,864,485 | 9/1989 | Rilly et al. | 363/49 |
| 5,200,886 | 4/1993 | Shwarz et al. | 363/49 |

FOREIGN PATENT DOCUMENTS

0030026 11/1980 European Pat. Off.
0130411 6/1984 European Pat. Off.

OTHER PUBLICATIONS

Electronic Design, vol. 36, No. 20. 8 Sep. 1988, Hasbrouk Heights; New Jersey, p. 111, C. Spearow: "Get Start-And-Run Voltage for Motors".

Primary Examiner—Steven L. Stephan
Assistant Examiner—Adolf Berhane
Attorney, Agent, or Firm—Fish & Richardson

[57] ABSTRACT

An electronic switching power supply for supplying power to a load from an input voltage source, including a flyback converter with a transformer having its primary coil connected in series with the collector-emitter circuit of a first transistor in parallel arrangement with the input voltage source, while its secondary coil is connected in series with the load and a first diode, with the emitter of the first transistor being connected to chassis or reference potential through a first resistor while the base of the first transistor is connected to a control circuit (St), with a capacitor in parallel arrangement with the load, with the voltage across the junction (B) of the capacitor at the side remote from reference potential being of the same polarity as the voltage across the junction (A) of the first resistor and the first transistor. The power supply also includes a first circuit, including a second resistor, that is placed between the junction (A) of the first resistor (8) and the first transistor and the junction (B) of the capacitor at the side remote from reference potential, the first circuit serving to reduce a total effective resistance between the emitter of the first transistor and the reference or chassis potential when a voltage across said capacitor is below a predetermined value.

6 Claims, 1 Drawing Sheet

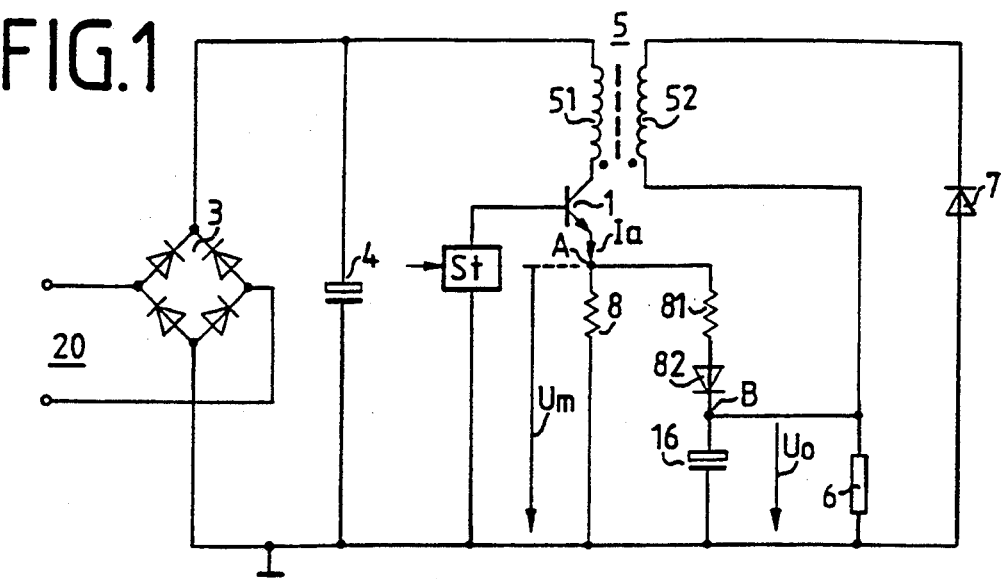
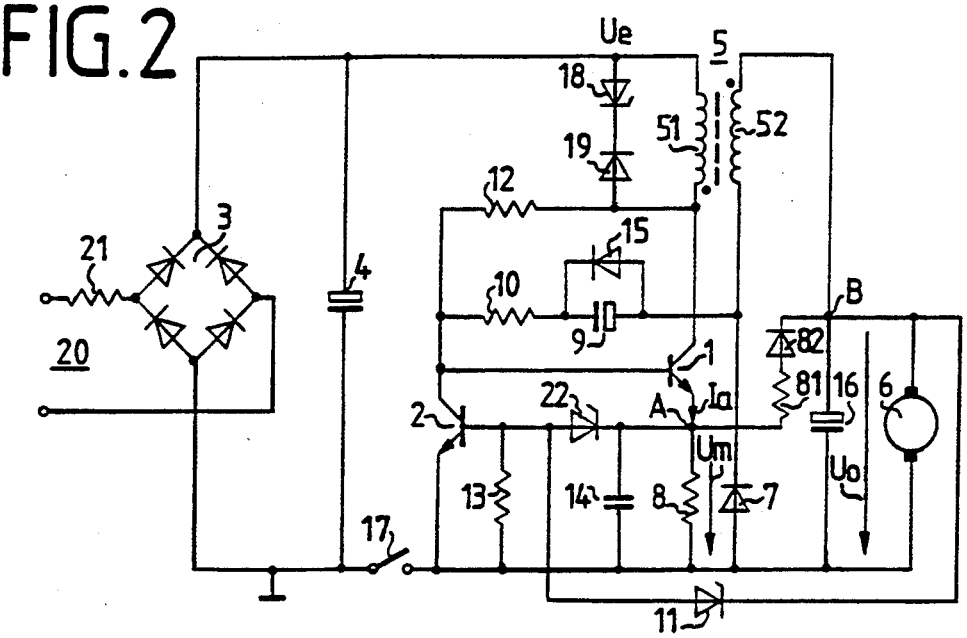
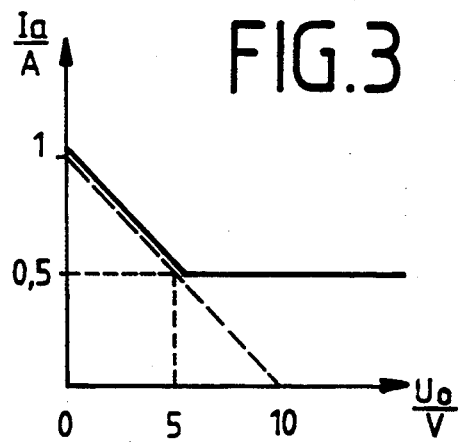

ELECTRONIC SWITCHING POWER SUPPLY

This is a continuation of application Ser. No. 07/927,519, filed as PCT/DE91/00/35, Feb. 20, 1991, now abandoned.

BACKGROUND OF THE INVENTION

This invention relates to an electronic switching power supply for supplying power to a load from an input voltage source, including a flyback converter with a transformer having its primary coil connected in series with the collector-emitter circuit of a first transistor in parallel arrangement with the input voltage source, while its secondary coil is connected in series with the load and a first diode, with the emitter of the first transistor being connected to chassis or reference potential through a first resistor while the base of the first transistor is connected to a control circuit, with a capacitor in parallel arrangement with the load, with the voltage across the junction of the capacitor at the side remote from reference potential being of the same polarity as the voltage across the junction of the first resistor and the first transistor.

Electronic switching power supplies are used for delivering a constant voltage and/or a constant current to electrical or electronic devices, being frequently constructed as primary or secondary switched-mode flyback or forward converters or as push-pull converters. As a rule, they include a rectifier circuit with a subsequent filtering and smoothing arrangement to which a transformer is connected. An electronic switch is provided which is connected in series with the primary coil of the transformer and is turned ON and OFF in dependence upon one or several control variables, with the energy stored in the transformer being delivered to an electrical load through a diode of suitable polarity during the reverse period where a flyback converter is used, during the forward period where a forward converter is used, and during both the reverse and the forward period where a push-pull converter is used.

A switching power supply of the type initially referred to is known, for example, from EP 0 130 411 B1. The embodiment shown in FIG. 2 of this specification incorporates a self-oscillating flyback converter, that is, the control circuit connected to the base of the first transistor is substantially comprised of the feedback from the secondary circuit through a capacitor and a resistor to the base of the first transistor, as well as a second transistor having its collector-emitter circuit between the base of the first transistor and reference potential, its base receiving the voltage drop across the first resistor. However, the present invention being not limited to a switching power supply with a self-oscillating flyback converter, it also finds application in switching power supplies having a master-excited flyback converter. In such an arrangement, the control circuit comprises, for example, a multivibrator whose clock frequency or pulse/no-pulse ratio driving the base of the first transistor varies in dependence upon the input voltage, the primary current, and/or the secondary current.

Depending on the application, such switching power supplies are conventionally designed for supplying a predetermined (maximum) operating current. In some applications, however, the load which may be, for example, the motor of a small electrical appliance such as a shaver or a hair-removing appliance, requires a starting current substantially higher than its operating current. Under such conditions, it would be only because of the temporary need for a higher starting current that the switching power supply would have to be designed for peak currents substantially higher than required by the load in operation, accordingly resulting in an increased power dissipation also on termination of the startup phase because of the higher primary peak current. For example, the first resistor arranged in the primary circuit would have to be substantially smaller to enable a higher primary peak current to flow, which would above all produce higher losses in the switching transistor.

SUMMARY OF THE INVENTION

It is therefore an object of the present invention to configure an electronic switching power supply of the type initially referred to in such a manner as to enable it to deliver a higher starting current to the load without involving the need for a higher primary peak current during operation, that is, on termination of the startup phase.

This object is accomplished by the present invention in that a second resistor is placed between the junction of the first resistor and the first transistor and the junction of the capacitor at the side remote from reference potential.

Because the current delivered by the flyback converter is proportional to the emitter resistance of the switching transistor, the solution of the invention provides a simple means of supplying through the second resistor an additional primary current in the startup phase, that is, during the period of time when the voltage across the load is of a magnitude smaller than the maximum voltage drop across the first resistor, the second resistor being then connected in parallel with the first resistor through the load.

In an advantageous embodiment of the present invention, a second diode is connected in series with the second resistor.

Connecting a diode in series has the advantage that the second resistor is turned off automatically when the voltage across the load has attained the magnitude of the maximum voltage drop across the second resistor.

Further advantageous embodiments will become apparent from the other subclaims.

The invention will be described in greater detail in the following with reference to embodiments illustrated in the accompanying drawings.

BRIEF DESCRIPTION OF THE DRAWING

FIG. 1 is an electrical schematic illustrating an embodiment of the invention;

FIG. 2 is a circuit configuration of a switching power supply with a self-oscillating flyback converter; and FIG. 3 is a graph showing the primary peak current Ia plotted against the load voltage Uo using a second resistor (broken line), and using a second resistor and a second diode in series arrangement (solid line).

DESCRIPTION OF THE PREFERRED EMBODIMENT

The schematic of an electronic switching power supply shown in FIG. 1 is comprised of a flyback converter energized from a dc or ac supply 20 through a bridge rectifier arrangement 3. An input capacitor 4 for filtering and smoothing the input voltage is connected in parallel with the dc voltage input terminals of the bridge rectifier arrangement 3.

Connected in parallel with the input capacitor 4 is the series arrangement comprised of the primary coil 51 of a transformer 5 and the load circuit of a first transistor 1 and a first resistor 8.

The secondary coil 52 of the transformer 5 is series-connected to a diode 7 and a parallel circuit comprised of a capacitor 16 and a load 6.

The base of transistor 1 is driven by a control circuit St. The configuration of the control circuit St may vary, depending also on whether the flyback converter is of the self-oscillating or master-excited type.

Between the junction A connecting the emitter of the switching transistor 1 to the resistor 8 and the junction B connecting the capacitor 16 to the load 6 at the side remote from reference potential, a series circuit comprised of a resistor 81 and a diode 82 is arranged. Diode 82 may also be a Zener diode. In this embodiment, the diode has its cathode connected to junction B, because transistor 1 is an NPN transistor. If a PNP type transistor is used, diode 82 must have its cathode connected to junction A.

FIG. 2 shows the detailed circuit arrangement of a switching power supply with a self-oscillating flyback converter.

The base of transistor 1 is connected to the one end of the primary coil 51 of the transformer 5 through a resistor 12, to the one end of the secondary coil 52 of the transformer 5 through the series arrangement comprised of a feedback capacitor 9 and a feedback resistor 10, and to the collector of a transistor 2 having its emitter connected to the one dc terminal of the bridge rectifier arrangement 3 through a switch 17.

Through a first reference element in the form of a Zener diode 11, the base of transistor 2 is connected to the other end of the secondary coil 52 of the transformer 5 and to the output capacitor 16 or the dc motor 6, and, through a second reference element in the form of a Zener diode 22, to the emitter of the first transistor 1. In parallel arrangement with the base-emitter circuit of transistor 2 is a resistor 13, a capacitor 14 being provided parallel to resistor 8.

The series arrangement comprised of a Zener diode 18 and a diode 19 of a polarity allowing current to flow in opposite direction, their respective cathodes being interconnected, serves the function of eliminating or limiting the peaks of the voltage kick-back pulses resulting from leakage inductance.

In parallel arrangement with the feedback capacitor 9 is a diode 15 having its anode connected to the one end of the secondary coil 52 of the transformer 5.

Accordingly, in FIG. 2 the control circuit St (FIG. 1) is substantially comprised of the feedback capacitor 9, the feedback resistor 10, and the transistor 2. In lieu of transistor 2, a Zener diode may be arranged between the base of transistor 1 and reference potential. This Zener diode will be conducting when the voltage (Um) dropping across the resistor 8 plus the base-emitter voltage of transistor 1 have attained the magnitude of the Zener voltage of the Zener diode. In this event, the control circuit must be connected to the emitter of transistor 1.

The series circuit comprised of resistor 81 and diode 82 is placed between the emitter of the switching transistor (junction A) and the side of the dc motor 6 remote from reference potential (junction B).

It will be understood that an accumulator used for operation of the dc motor 6 independently of the line may be provided parallel to the dc motor 6 through a corresponding switch arrangement.

In the following, the mode of operation of the switching power supply of FIG. 2 will be described as if the resistor 81 and the diode 82 were omitted.

When an ac line voltage is applied to the bridge rectifier arrangement 3, the rectified ac voltage is supplied to the smoothing and filtering capacitor 4, so that the current flowing through the primary coil 51 of the transformer 5 and the resistor 12 charges the feedback capacitor 9 through the feedback resistor 10 until the voltage on the base of transistor 1 has increased to a value rendering transistor 1 conducting. The collector current thereby produced flows through the primary coil 51 of the transformer 5, inducing in the secondary coil 52 a positive voltage which is delivered through the feedback capacitor 9 and the feedback resistor 10 to the base of transistor 1, producing a higher base current. With transistor 1 turned on, the current flowing through the primary coil 51 of the transformer 5 will rise linearly as a result of the inductance of the primary coil 51, until a voltage which is proportional to the linearly rising current drops across resistor 8, which voltage, from a predetermined magnitude on, allows a base current to flow in transistor 2, turning on the second transistor 2 and pulling the potential on the base of transistor 1 down to reference potential, turning transistor 1 off. During the off period of transistor 1, the magnetic energy stored in the core of the transformer 5 is delivered through the secondary coil 52 and the diode 7 to the output capacitor 16.

When the voltage residing at the output capacitor 16 exceeds the Zener voltage of the Zener diode 11 as a result of the charging condition of the output capacitor 16, transistor 2 will be maintained conducting, independently of the voltage drop across resistor 8, so that chassis or reference potential is always maintained at the base of transistor 1, as a result of which the flyback converter stops operating. Only when, as a result of the current consumed by the parallel-connected dc motor 6, the voltage across the output capacitor 16 has dropped to a value below the Zener voltage of the Zener diode 11, will the off or on state of transistor 2 and thus of transistor 1 become dependent again on the voltage drop across resistor 8 with respect to the Zener voltage of the Zener diode 22, and the flyback converter is able to start oscillating again.

The Zener diode 22 serves the function of placing transistor 2 in conduction when the Zener voltage of the Zener diode 22 is exceeded as a result of the voltage increase across the emitter resistor 8.

The parallel arrangement of the diode 15 and the feedback capacitor 9 enables the flyback converter to resume oscillation promptly when the voltage falls below the Zener voltage of the Zener diode 11, because the output voltage residing at the secondary coil 52 of the transformer 5 immediately provides through the diode 15 a polarity driving transistor 1.

Assuming, for example, a primary peak current Ia of 0.5 A and an emitter resistance of 10 ohms (excluding resistor 81 and diode 82), the maximum peak voltage dropping across the emitter resistor is Um=5 V. The peak current occurring in the secondary circuit is proportional to the primary peak current. If the thus attainable arithmetic mean of the current passing through the load 6 is not sufficient, the primary peak current must be increased. This could be accomplished, for example, by making the emitter resistor 8 smaller. However, if the load 6 which, for example, is a dc motor, requires an increased current only in the startup phase, this solution would produce unnecessarily high switching losses in transistor 1 also in the normal operating mode, because the primary peak current remains unchanged.

To supply the load 6 with a higher starting current producing a correspondingly higher motor starting torque, resistor 81 and diode 82 are inserted between junction A and junction B. The mode of operation of this configuration will be explained with reference to FIG. 3. In this Figure, the primary peak current Ia is plotted against the voltage Uo residing at the load 6 and at the capacitor 16 when power is turned on. The voltage Uo is thus a function of time. Resistor 81 and resistor 8 have each a resistance of 10 ohms, the operating voltage of the load is Uo=10 V. At the instant that power is turned on and neglecting the forward voltage of diode 82, the primary peak current is Ia=1 A instead of the previous 0.5 A, because at this instant the voltage across junction B is 0 V with respect to reference potential.

The following equation applies:

$$Ia = \frac{Um}{R8} + \frac{Um - Uf - Uo}{R81}$$

where Uf is the forward voltage of diode 82. With the output voltage Uo rising (rotational frequency of motor increasing), the amplitude of the primary peak current Ia will decrease.

If both the resistor 81 and the diode 82 are arranged between junctions A and B, the solid line drawn in FIG. 3 shows the characteristic of Ia as a function of Uo (neglecting Uf). When Uo=5 V which corresponds to the maximum voltage Um across resistor 8, the primary peak current will have dropped to 0.5 A. If the voltage Uo subsequently increases to a magnitude exceeding 5 V, resistor 81 will be turned off automatically, since diode 82 is cut off. The primary peak current Ia is 0.5 A, as before without the resistor 81.

Diode 82 may also be omitted. With such a configuration, the broken line drawn in FIG. 3 results. If the voltage Uo then exceeds the voltage Um (at 5 V), that is, the potential across junction B is greater than across junction A, the primary peak current Ia will continue to drop, yet an additional current will flow from the secondary circuit through resistor 81 and resistor 8 to reference potential. While the purpose to achieve a higher starting current is equally well accomplished in the absence of diode 82, the power dissipation under operating conditions is greater than it would be in the presence of diode 82 because of the current flow from B to A through resistor 81.

Without diode 82, the following equation applies:

$$Uo = \frac{R8 + R81}{R8} \times Um$$

I claim:
1. An electronic switching power supply for supplying power to a load from an input voltage source, said power supply comprising a first transistor, a first diode, and a flyback converter with a transformer having a primary coil and a secondary coil, said primary coil connected in series with the collector-emitter circuit of said first transistor in parallel arrangement with the input voltage source, said secondary coil connected in series with the load and said first diode, said power supply further comprising a first resistor connecting the emitter of the first transistor to a chassis or reference potential, a control circuit connected to the base of the first transistor, a capacitor in parallel arrangement with the load, and a first circuit connected between the emitter of the first transistor and one side of said capacitor, the other side of said capacitor being connected to said reference or chassis potential, said first circuit including a second resistor, said first circuit serving to reduce a total effective resistance between the emitter of the first transistor and the reference or chassis potential when a voltage across said capacitor is below a predetermined value and to increase said total effective resistance when the voltage across said capacitor rises above the predetermined value, thereby causing the power supply to deliver more current to the load when said voltage is below said predetermined value than when said voltage is above the predetermined value.

2. The switching power supply as claimed in claim 1, wherein said first circuit further comprises a second diode connected in series with the second resistor, its anode being connected to the emitter of the first transistor if the first transistor is an NPN-type transistor, its cathode being connected to the emitter of the first transistor if the first transistor is a PNP-type transistor.

3. The switching power supply as claimed in claim 1, wherein the flyback converter is self-oscillating, and the control circuit is comprised of a series arrangement of a feedback capacitor and a feedback resistor placed between the secondary coil of the flyback converter and the base of the first transistor, and of a reference voltage source which is arranged between the base of the first transistor and said chassis or reference potential and becomes conducting from a predetermined voltage.

4. The switching power supply as claimed in claim 3, wherein the reference voltage source is a Zener diode.

5. The switching power supply as claimed in claim 3, further comprising a second transistor having its base electrically coupled to the emitter of said first transistor and wherein the reference voltage source is the collector-emitter circuit of said second transistor.

6. The switching power supply as claimed in claim 1, wherein the load is a dc motor.

* * * * *